(12) United States Patent
Johnson et al.

(10) Patent No.: US 8,331,391 B2
(45) Date of Patent: *Dec. 11, 2012

(54) NETWORK ABSTRACTION AND ISOLATION LAYER FOR MASQUERADING MACHINE IDENTITY OF A COMPUTER

(75) Inventors: Scott C. Johnson, Austin, TX (US); Dave D. McCrory, Austin, TX (US)

(73) Assignee: Quest Software, Inc., Aliso Viejo, CA (US)

( * ) Notice: Subject to any disclaimer, the term of this patent is extended or adjusted under 35 U.S.C. 154(b) by 231 days.

This patent is subject to a terminal disclaimer.

(21) Appl. No.: 12/838,009

(22) Filed: Jul. 16, 2010

(65) Prior Publication Data

US 2010/0281181 A1    Nov. 4, 2010

Related U.S. Application Data

(63) Continuation of application No. 10/950,355, filed on Sep. 24, 2004, now Pat. No. 7,769,004.

(60) Provisional application No. 60/506,309, filed on Sep. 26, 2003.

(51) Int. Cl.
*H04L 12/56* (2006.01)
*H04J 1/16* (2006.01)

(52) U.S. Cl. ......... 370/419; 370/252; 370/389; 370/392

(58) Field of Classification Search ................. 370/252, 370/389, 392, 419
See application file for complete search history.

(56) References Cited

U.S. PATENT DOCUMENTS

| | | |
|---|---|---|
| 4,912,628 A | 3/1990 | Briggs |
| 5,062,037 A | 10/1991 | Shorter et al. |
| 5,201,049 A | 4/1993 | Shorter |
| 5,611,050 A | 3/1997 | Theimer et al. |
| 5,757,924 A | 5/1998 | Friedman et al. |
| 5,802,290 A | 9/1998 | Casselman |
| 5,805,824 A | 9/1998 | Kappe |
| 5,917,997 A | 6/1999 | Bell et al. |
| 5,996,026 A | 11/1999 | Onodera et al. |
| 5,999,518 A | 12/1999 | Nattkemper et al. |
| 6,003,050 A | 12/1999 | Silver et al. |
| 6,006,264 A | 12/1999 | Colby et al. |
| 6,023,724 A | 2/2000 | Bhatia et al. |
| 6,038,566 A | 3/2000 | Tsai |
| 6,041,347 A | 3/2000 | Harsham et al. |
| 6,067,545 A | 5/2000 | Wolff |

(Continued)

OTHER PUBLICATIONS

Baltazar, Henry. "Virtual Storage Age." Downloaded from http://www.eWEEK.com. pp. 45 and 48. Aug. 27, 2001. Ziff Davis Media Inc., New York, New York.

(Continued)

*Primary Examiner* — John Pezzlo
(74) *Attorney, Agent, or Firm* — Knobbe Martens Olson & Bear, LLP

(57) ABSTRACT

A network abstraction and isolation layer (NAIL) for masquerading the machine identity of a computer in a network to enable the computer to communicate in the network with a different machine identity including an isolated network interface for communicating with the computer, an abstraction network interface for communicating with a network device coupled to the network, and control instructions or device. The control instructions or device performs machine identity translation to masquerade machine identity of the computer relative to the network. Machine identity masquerading includes selectively translating any one or more of an IP address, a MAC address, a machine name, a system identifier, and a DNS Name in the header or payload of communication packets.

18 Claims, 6 Drawing Sheets

U.S. PATENT DOCUMENTS

| | | | |
|---|---|---|---|
| 6,069,894 A | 5/2000 | Holender et al. |
| 6,075,938 A | 6/2000 | Bugnion et al. |
| 6,092,178 A | 7/2000 | Jindal et al. |
| 6,104,699 A | 8/2000 | Holender et al. |
| 6,118,784 A | 9/2000 | Tsuchiya et al. |
| 6,130,892 A | 10/2000 | Short et al. |
| 6,185,601 B1 | 2/2001 | Wolff |
| 6,192,417 B1 | 2/2001 | Block et al. |
| 6,247,057 B1 | 6/2001 | Barrera, III |
| 6,256,637 B1 | 7/2001 | Venkatesh et al. |
| 6,263,358 B1 | 7/2001 | Lee et al. |
| 6,272,523 B1 | 8/2001 | Factor |
| 6,272,537 B1 | 8/2001 | Kekic et al. |
| 6,282,602 B1 | 8/2001 | Blumenau et al. |
| 6,347,328 B1 | 2/2002 | Harper et al. |
| 6,370,560 B1 | 4/2002 | Robertazzi et al. |
| 6,453,426 B1 | 9/2002 | Gamache et al. |
| 6,496,847 B1 | 12/2002 | Bugnion et al. |
| 6,535,511 B1 | 3/2003 | Rao |
| 6,553,401 B1 | 4/2003 | Carter et al. |
| 6,567,839 B1 | 5/2003 | Borkenhagen et al. |
| 6,571,283 B1 | 5/2003 | Smorodinsky |
| 6,607,545 B2 | 8/2003 | Kammerer et al. |
| 6,609,213 B1 | 8/2003 | Nguyen et al. |
| 6,625,705 B2 | 9/2003 | Yanai et al. |
| 6,633,916 B2 | 10/2003 | Kauffman |
| 6,640,239 B1 | 10/2003 | Gidwani |
| 6,665,304 B2 | 12/2003 | Beck et al. |
| 6,745,303 B2 | 6/2004 | WataWatanabe |
| 6,760,775 B1 | 7/2004 | Anerousis et al. |
| 6,788,681 B1 * | 9/2004 | Hurren et al. ............ 370/389 |
| 6,865,613 B1 | 3/2005 | Millet et al. |
| 6,880,002 B2 | 4/2005 | Hirschfeld et al. |
| 6,931,003 B2 | 8/2005 | Anderson |
| 6,985,479 B2 | 1/2006 | Leung et al. |
| 6,985,485 B2 | 1/2006 | Tsuchiya et al. |
| 6,985,937 B1 | 1/2006 | Keshav et al. |
| 6,990,666 B2 | 1/2006 | Hirschfeld et al. |
| 7,020,720 B1 | 3/2006 | Donahue et al. |
| 7,043,665 B2 | 5/2006 | Kern et al. |
| 7,065,589 B2 | 6/2006 | Yamagami |
| 7,076,560 B1 | 7/2006 | Lango et al. |
| 7,139,841 B1 | 11/2006 | Somasundaram et al. |
| 7,154,891 B1 | 12/2006 | Callon |
| 7,200,622 B2 | 4/2007 | Nakatani et al. |
| 7,215,669 B1 | 5/2007 | Rao |
| 7,219,161 B1 | 5/2007 | Fagundo et al. |
| 7,222,172 B2 | 5/2007 | Arakawa et al. |
| 7,234,075 B2 | 6/2007 | Sankaran et al. |
| 7,257,584 B2 | 8/2007 | Hirschfeld et al. |
| 7,280,557 B1 | 10/2007 | Biswas et al. |
| 7,287,186 B2 | 10/2007 | McCrory et al. |
| 7,356,679 B1 | 4/2008 | Le et al. |
| 7,421,505 B2 | 9/2008 | Berg |
| 7,574,496 B2 | 8/2009 | McCrory et al. |
| 7,643,484 B2 | 1/2010 | Willman et al. |
| 7,769,004 B2 | 8/2010 | Johnson et al. |
| 8,078,728 B1 | 12/2011 | Pollan et al. |
| 8,194,674 B1 | 6/2012 | Pagel et al. |
| 2002/0065864 A1 | 5/2002 | Hartsell et al. |
| 2002/0103889 A1 | 8/2002 | Markson et al. |
| 2002/0129082 A1 | 9/2002 | Baskey et al. |
| 2002/0152310 A1 | 10/2002 | Jain et al. |
| 2002/0159447 A1 | 10/2002 | Carey et al. |
| 2002/0184642 A1 | 12/2002 | Lude et al. |
| 2002/0194251 A1 | 12/2002 | Richter et al. |
| 2003/0005104 A1 | 1/2003 | Deboer et al. |
| 2003/0005166 A1 | 1/2003 | Seidman |
| 2003/0018927 A1 | 1/2003 | Gadir et al. |
| 2003/0023774 A1 | 1/2003 | Gladstone et al. |
| 2003/0105829 A1 | 6/2003 | Hayward |
| 2003/0188233 A1 | 10/2003 | Lubbers et al. |
| 2004/0044778 A1 | 3/2004 | Alkhatib et al. |
| 2004/0052216 A1 | 3/2004 | Roh |
| 2004/0078467 A1 | 4/2004 | Grosner et al. |
| 2004/0186905 A1 | 9/2004 | Young et al. |
| 2005/0013280 A1 | 1/2005 | Buddhikot et al. |
| 2005/0044220 A1 | 2/2005 | Madhavan |
| 2005/0228835 A1 | 10/2005 | Roa |
| 2005/0229175 A1 | 10/2005 | McCrory et al. |
| 2005/0240668 A1 | 10/2005 | Rolia et al. |
| 2005/0240964 A1 | 10/2005 | Barrett |
| 2005/0246436 A1 | 11/2005 | Day et al. |
| 2005/0249199 A1 | 11/2005 | Albert et al. |
| 2006/0013209 A1 | 1/2006 | Somasundaram |
| 2006/0136490 A1 | 6/2006 | Aggarwal et al. |
| 2006/0282892 A1 | 12/2006 | Jonnala et al. |
| 2006/0288251 A1 | 12/2006 | Jackson |
| 2007/0005769 A1 | 1/2007 | Ammerlaan et al. |
| 2007/0088721 A1 | 4/2007 | Srivastava |
| 2007/0180453 A1 | 8/2007 | Burr et al. |
| 2007/0192508 A1 * | 8/2007 | Sollee ..................... 709/245 |
| 2010/0281181 A1 | 11/2010 | Johnson et al. |

OTHER PUBLICATIONS

Vizard, Michael. "Automated Help is on the Horizon." InfoWorld. Mar. 1, 2002. pp. 1-2. InfoWorld Media Group, San Francisco, CA.

Long et al., "Swift/RAID: A Distributed RAID System", Summer 1994, Computing Systems, vol. 7, Issue 3.

PCT Notification of Transmittal of the International Search Report or the Declaration for PCT/US02/28011, dated Feb. 25, 2003, 5 pages.

PCT Notification of Transmittal of the International Search Report or the Declaration for PCT/US0240286, dated Mar. 28, 2003, 3 pages.

Stonebraker et al., "Distributed RAID—A New Multiple Copy Algorithm", 1990, IEEE.

* cited by examiner

NETWORK ABSTRACTION AND ISOLATION LAYER FOR MASQUERADING MACHINE IDENTITY OF A COMPUTER

CROSS-REFERENCE TO RELATED APPLICATIONS

This application is a continuation of U.S. patent application entitled "NETWORK ABSTRACTION AND ISOLATION LAYER FOR MASQUERADING MACHINE IDENTITY OF A COMPUTER", Ser. No. 10/950,355, filed Sep. 24, 2004, which itself claimed priority to U.S. Provisional Application Ser. No. 60/506,309 filed on Sep. 26, 2003, both of which being incorporated herein by reference in their entireties for all intents and purposes.

BACKGROUND OF THE INVENTION

1. Field of the Invention

The present invention relates to computer networks, and more particularly to a network abstraction and isolation layer (NAIL) that provides abstraction and/or isolation to isolate machine identity of one or more computers in a network system.

2. Description of the Related Art

Computer systems are often designed or otherwise optimized for a particular operating system (OS) and/or specific application programs. There is a need in the industry, however, to break the traditional tie between a specific machine and the particular OS or computers that are less application-specific than the traditional models. In many instances, for example, there is a need to provide a generic or general purpose server system and to replicate that system on an as-needed basis. Or a library of pre-configured server types may be designed, each configured according to a particular set of functions. It is further desired to be able to replicate an existing server on the fly and use multiple clones of the server in the same network environment. Such on-demand replication would be advantageous to handle pre-specified demands or loads, or in response to an increased demand in a given network. For example, on-demand replication would enable a system administrator or an application manager to quickly and/or automatically recruit additional "boxes" to increase overall computing capacity, such as hot-plugging one or more new servers into the network.

An inherent problem with computer system replication for use in the same network is that one or more of the unique network identifiers are also replicated. There are several unique system identifiers for a computer system that give each machine a unique identity, including a Media Access Control (MAC) address, an Internet Protocol (IP) address, a machine name (MN), and for many computers an additional system or security identifier (SID) (e.g., a system security identifier or SSID for Windows®-based machines). Another unique identifier is the Domain Name Service (DNS) Name. The IP and MAC are OS universal whereas the MN, SID and DNS Name identifiers are typically OS and/or application specific. The MAC address is typically burned into a memory device upon manufacture and tied to a single network port, such as implemented on a network interface card (NIC). The MAC and IP addresses are often used to enable communications between devices on a network, such as, for example, TCP/IP communications. The IP and MAC addresses can be particularly problematic since either or both can be embedded within certain application programs. An embedded network identifier imposes a problem for on-the-fly replication since it would otherwise have to be modified to prevent an identification conflict in a given network.

There is a system preparation tool from MicroSoft® called SysPrep that enables a new server system to be created based on an existing server system. For example, if a machine is loaded with a selected operating system, such as, for example, Windows® 2000, referred to as a "Win2K" system, then the SysPrep tool may be used to create a second, duplicate Win2K system on a different hardware setup. The unique system identifiers are changed on the new system to give it a unique identity.

The SysPrep tool is useful for manufactures to create new servers from an existing server profile, but only prior to loading software applications. Once particular software applications have been loaded, the SysPrep tool is not useful for on-demand replication of the server for use in the same network since many applications imbed one or more of the unique system identifiers. The software applications are instead loaded and configured after the SysPrep tool is used. The amount of time necessary to load and configure application programs is prohibitive for on-demand or hot-plug applications.

An on-demand replication capability is particularly advantageous for use with virtual servers. Virtualization technology enables multiple logical servers to operate on a single physical computer. A logical server may originate as a set of files that may be assembled and activated. Virtual servers suffer from a similar problem as their physical counterparts. Although some unique system identifiers may be readily modified after duplication, any identifiers embedded within any application programs must be located and changed. Otherwise, the replicated system is useless in the same networking environment as the original server. Although replication may work for some system configurations, it will not work for all configurations and is therefore not an elegant solution.

The replication problem illustrates a broader problem of network identity control. Embedded network identifiers make it very difficult to enable a computer system to communicate in the network without identification conflicts. Even if computers are not replicated, there are other situations and applications in which it may be desired to alter or otherwise isolate a computer in a network and to enable that computer to communicate in the network, such as server or application farms, cluster failover, re-routing functionality, virtual local area networks (VLANs), network traffic filtering, disaster recovery, etc. It is desired to provide complete control of network identity in a network while avoiding potential identification conflicts between computers.

SUMMARY OF THE INVENTION

A non-transitory computer-readable storage medium encoded with a virtual network abstraction and isolation layer (NAIL) is disclosed which instructs a processor to masquerade the machine identity of a computer in a local network to enable the computer to communicate in the local network with a different machine identity. The virtual NAIL includes first and second sets of interface instructions and control instructions encoded on the computer-readable storage medium. The first set of interface instructions instructs the processor to configure a virtual isolated network interface for communicating with the computer. The second set of interface instructions instruct the processor to configure an abstraction network interface for communicating with a network device coupled to the local network. The control instructions instruct the processor to translate an IP address and a Media Access Control (MAC) address to a different IP address and a different MAC address, respectively, in a packet header of a communication packet transmitted between said virtual isolated and abstraction network interfaces, and instruct the processor to translate at least one of a machine name and a system identifier to a different machine name and a different system identifier, respectively, in a packet payload of the communication packet.

The control instructions may further instruct the processor to translate at least one of an IP address and a Domain Name Service (DNS) Name to a different one of an IP address and a DNS Name, respectively, in the packet payload of the communication packet. The control instructions may further instruct the processor to translate an IP address to a different IP address in the packet payload of the communication packet between said virtual isolated and abstraction network interfaces. The control instructions may further instruct the processor to translate a Domain Name Service (DNS) Name to a different DNS Name in the packet payload of the communication packet. The control instructions may further instruct the processor to employ a configurable list of translations. The control instructions may further instruct the processor to selectively translate communication packets based on communication protocol.

A network abstraction and isolation layer (NAIL) apparatus is disclosed for masquerading the machine identity of a computer in a local network to enable the computer to communicate in the local network with a different machine identity. The NAIL apparatus includes a physical isolated network interface port which is configured to communicate with the computer, a physical abstraction network interface port which is configured to communicate with a network device coupled to the local network, and a control device, coupled between the isolated and abstraction network ports, which is configured to perform machine identity translation to masquerade machine identity of the computer within the local network. The control device is configured to translate an IP address and a Media Access Control (MAC) address to a different IP address and a different MAC address, respectively, in a packet header of a communication packet transmitted between the isolated and abstraction network ports. The control logic is further configured to translate at least one of a machine name and a system identifier to a different machine name and a different system identifier, respectively, in a packet payload of the communication packet.

The control device may further be configured to translate at least one of an IP address and a Domain Name Service (DNS) Name to a different one of an IP address and a DNS Name, respectively, in the packet payload of the communication packet. The control device may further be configured to translate an IP address to a different IP address in the packet payload of the communication packet between said isolated and abstraction network ports. The control device may further be configured to translate a Domain Name Service (DNS) Name to a different DNS Name in the packet payload of the communication packet. The control device may further be configured to employ a configurable list of translations. The control device may further be configured to selectively translate communication packets based on communication protocol.

BRIEF DESCRIPTION OF THE DRAWINGS

The benefits, features, and advantages of the present invention will become better understood with regard to the following description, and accompanying drawings where.

DETAILED DESCRIPTION

Figure 1:
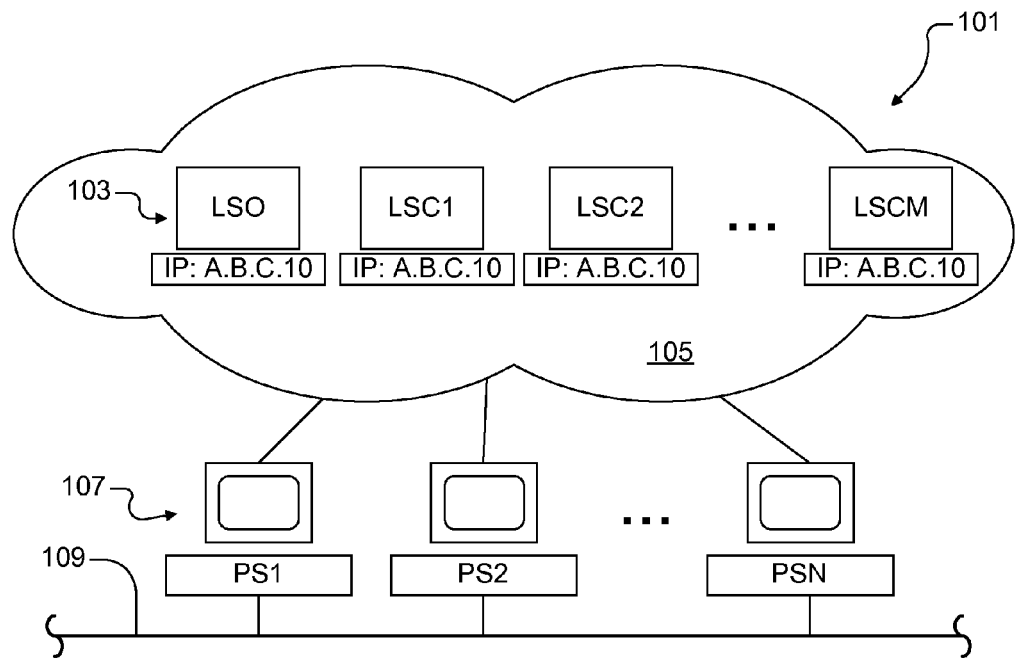
FIG. 1 is a block diagram of an exemplary virtualized logical server cloud implemented according to an embodiment of the present invention.

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The following definitions are provided for this disclosure with the intent of providing a common lexicon. A "physical" device is a material resource such as a server, network switch, network interface card (NIC), disk drive, etc. Even though physical devices are discrete resources, they are not inherently unique. For example, random access memory (RAM) devices and a central processing unit (CPU) in a physical server may be interchangeable between like physical devices. Also, network switches may be easily exchanged with minimal impact. A "logical" device is a representation of a physical device to make it unique and distinct from other physical devices. For example, every network interface has a unique media access control (MAC) address. A MAC address is the logical unique identifier of a physical device, such as a NIC. A "traditional" device is a combined logical and physical device in which the logical device provides the entire identity of a physical device. For example, a physical NIC has its MAC address permanently affixed so the physical device is inextricably tied to the logical device.

A "virtual" device breaks the traditional interdependence between physical and logical devices. Virtualization allows logical devices to exist as an abstraction without being directly tied to a specific physical device. Simple virtualization can be achieved using logical names instead of physical identifiers. For example, using an Internet Uniform Resource Locator (URL) instead of a server's MAC address for network identification effectively virtualizes the target server. Complex virtualization separates physical device dependencies from the logical device. For example, a virtualized NIC (VNIC) could have an assigned MAC address that exists independently of the physical resources managing the NIC network traffic.

A "server cloud" or "cloud" is a collection of logical devices which may or may not include underlying physical servers. The essential element of a cloud is that all logical devices in the cloud may be accessed without any knowledge or with limited knowledge of the underlying physical devices within the cloud. Fundamentally, a cloud has persistent logical resources, but is non-deterministic in its use of physical resources. For example, the Internet may be viewed as a cloud because two computers using logical names can reliably communicate even though the physical network is constantly changing.

A logical server (LS) is a virtual server implemented using virtualization software and emulation application(s) executing on an underlying physical platform. The term "server" as used herein connotes any computing platform capable of running an OS, whether physical or virtual, and generally includes any computer system or personal computer (PC). Each logical server employs an OS encompassed by virtualization software, so that the OS operates as though the underlying software-generated platform is physical rather than virtual. Each logical server is intended to simulate a physical server so that the end-user may be unaware that the underlying computer platform is virtual rather than physical. A logical server effectively emulates an actual physical machine, and thus is functionally equivalent to the physical machine. Thus, operating systems and application software that run on the physical machine can be run on the logical server without modification.

A "logical server cloud" refers to a cloud comprising multiple logical servers, where each logical server is linked to one or more of a bank of physical servers. The boundary of the logical server cloud is defined by the physical resources controlled by a "cloud management infrastructure" or a "server cloud manager" or SCM. The server cloud manager has the authority to allocate physical resources to maintain the logical server cloud; consequently, the logical server cloud does not exceed the scope of physical resources under management control. Specifically, the physical servers controlled by the SCM determine a logical server cloud's boundary.

As illustrated herein, a network abstraction and isolation layer (NAIL) configuration according to an embodiment of the present invention provides network abstraction and network isolation to masquerade the machine identity of a computer on a network. Network abstraction (NA) enables a computer's network or machine identity to be aliased or altered. The term "masquerade" refers to changing or modifying at least one machine identifier to a different identifier while ensuring that the new machine identity is unique in the network. There are various reasons for masquerading a computer's machine identity. At least one reason is to prevent or otherwise preclude identity conflict with another computer on the network, such as when one computer is a clone or copy of another. In order to perform the masquerade function, the NAIL monitors communication packets and changes or modifies one or more identifiers within selected packets as necessary to masquerade the machine's identity. A packet is a string of bits divided into different segments. At its core is a data segment or payload (part of the original message). Additional information is added in the form of a packet header and, occasionally, a packet trailer. Examples of network abstraction include active/passive clusters in which cluster nodes share an identity that moves during failover and in application farms when a single identity represents the external entry point for the entire farm even though the actual requests are distributed to individual nodes. The Domain Name Service (DNS) illustrates network abstraction and the ability to provide indirection and aliasing. Network isolation (NI) enables a computer's identity to be obscured or blocked. Examples of network isolation include Network Address Translator (NAT) systems that aggregate requests from multiple computers through a single connection and firewalls that selectively block network traffic directed to a specific computer(s). The NAT function is typically limited to modifying IP addresses in packet headers to make multiple computers appear as a single computer, such as performed in a router or the like. Yet the NAT function is not suitable when multiple computers employ the same IP address, as further described below. Virtual Local Area Networks (VLANs) keep network traffic from one set of computers from interacting with traffic from another set even when they are connected to the same physical device.

The NAIL configuration combines abstraction and isolation to enable complete control of a computer's network or machine identity such that all of its in-bound and out-bound network communication can be intercepted and aliased. Whereas the NAT function translates different IP addresses in the packet headers to a common IP address, NAIL masquerades machine identity by either translating the IP address throughout the packet, such as embedded IP addresses in the packet payload, or by translating the IP address and the MAC address in the packet header, or a combination of both. Based on the particular communication protocol, NAIL may further translate additional identifiers in the packet payload, including any combination of IP address, MAC address, MN, SID and DNS Name. A computer on the isolation side of the NAIL has a consistent and carefully controlled network identity that is independent of external requirements. Ideally, the isolated computer does not determine that its network communications have been altered or its identity abstracted. Devices on the abstraction side of the NAIL configuration see a virtualized network identity of the isolated computer that may or may not represent its actual network characteristics. Ideally, computers communicating with an abstracted computer do not determine that the target of their communication has a different network or machine identity.

FIG. 1 is a block diagram of an exemplary virtualized logical server cloud system 101 implemented according to an embodiment of the present invention. The cloud system 101 includes multiple logical servers 103 forming a logical server cloud 105 and a bank of underlying physical servers 107 coupled together via a shared network 109. The present invention is illustrated using server computer systems, where it is understood that the present invention is applicable to all types of computers and computer systems. N physical servers 107, shown individually as PS1, PS2, . . . , PSN, provide the physical resources to support the logical servers 103 of the logical server cloud 105, where N is any positive integer. M+1 logical servers 103 are included within the server cloud 105, individually shown as LS0, LSC1, LSC2, . . . , LSCM, where M is any positive integer and is not necessarily the same as the number of physical servers 107 (e.g., N and M may or may not be the same number). In the configuration shown, LS0 is an original or master logical server, and the remaining logical servers LSC1-LSCM are replicated or cloned from LS0.

The process of replication of the master logical server LSO to generate the cloned logical servers LSC1-LSCM otherwise creates a potential identification conflict when two or more of the logical servers are activated at the same time and attempt to communicate via the same local network. As shown, for example, each logical server 103 is assigned an Internet Protocol (IP) address, shown in generalized format as IP="A.B.C.10". IP addresses are typically written as four sets of numbers from 0 to 255 separated by periods, such as, for example, "192.168.0.4". A subnet mask is often employed to identify a local network. For example, a subnet mask of "255.255.255.0" allows the first three numbers to identify a local network whereas the fourth distinguishes from among the devices in that local network. In the logical server cloud 105, however, since each of the logical servers 103 were replicated from the same source, the IP address is the same, i.e., IP="A.B.C.10". Each of the logical servers 103 may also be associated with the same gateway address, as further described below.

Since the identification designators are the same, from the local network point of view, none of the logical servers 103 would otherwise be able to communicate with each other or with external devices or computers coupled via the shared network 109. The cloud system 101, however, includes one or more NAILs that enable the logical servers 103 to communicate in the local network and with external devices.

Figure 2:
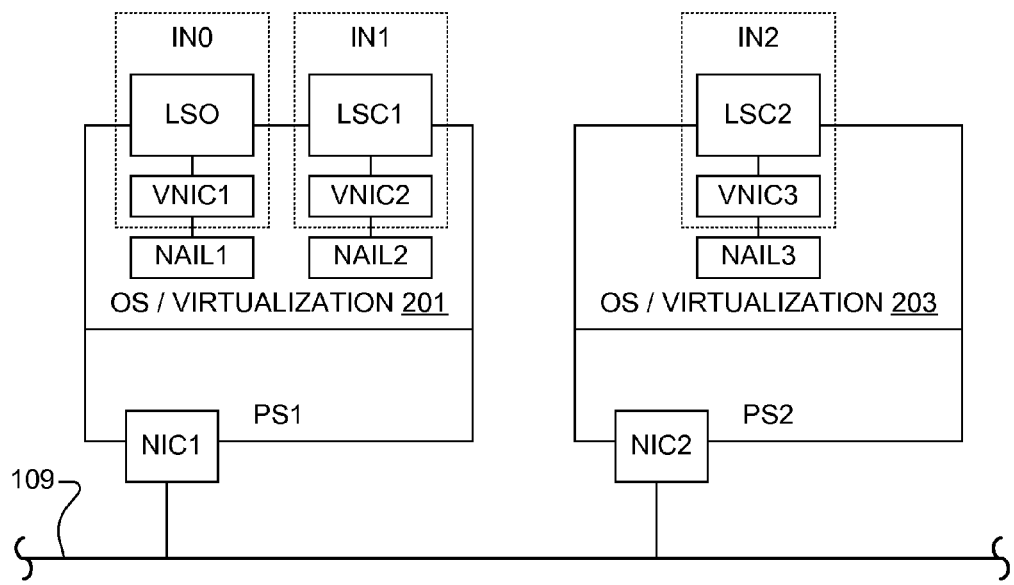
FIG. 2 is a more detailed block diagram of a portion of the virtualized logical server cloud of FIG. 1 illustrating the use of NAILs according to an embodiment of the present invention.

FIG. 2 is a more detailed block diagram of a portion of the cloud system 101 illustrating the use of NAILs according to an embodiment of the present invention. The physical servers PS1 and PS2 are shown coupled to the network 109 via corresponding physical NICs, shown as NIC1 and NIC2, respectively. Each physical server includes an operating system (OS) and virtualization layer, shown as OS/VIRTUALIZATION 201 and 203, respectively, where the virtualization layer generally incorporates the OS of the physical server. Each virtualization layer is further used to implement logical servers and related logical devices. As shown, logical servers LSO and LSC1 are implemented on the virtualization layer of PS1 and LSC2 is implemented on the virtualization layer of PS2. Each of the logical servers LSO, LSC1, and LSC2 includes a virtual NIC (VNIC), shown as VNIC1, VNIC2, and VNIC3, respectively, which are located or otherwise implemented within the corresponding virtualization layer of its underlying physical server.

In this case, the logical servers 103 share the same IP addresses, so that a NAIL is provided for each logical server, shown as NAIL1 interfaced to VNIC1, NAIL2 interfaced to VNIC2, and NAIL3 interfaced to VNIC3. Each NAIL is implemented in the virtualization layer of a corresponding one of the physical servers 107 for providing a network communication interface with a corresponding one of the logical servers 103. Each NAIL may include, for example, a modified Network Address Translator (NAT) infrastructure to establish a gateway for a corresponding logical server 103. In one embodiment, a simplified NAT function, referred to as a µNAT, is employed in each NAIL. The NAT function is simplified in that rather than translating the IP address for many computers, the translation is performed for a single isolated computer. The NAIL function goes further by translating the machine ID, including the MAC address, if necessary, and optionally other identifiers depending upon the particular packet type or communication protocol generating the packet. Each logical server 103 is effectively located within its own isolated network (IN) and communicates with other devices via its NAIL. One example of an isolated network is referred to as a virtual private network (VPN), although an IN may or may not be a VPN. As shown, LSO is located within IN0, LSC1 is located within IN1, LSC2 is located within IN2, and so on. Each NAIL changes packet headers and optionally embedded payload identifiers of incoming and outgoing packets and keeps track of each session of its isolated server to maintain communications without conflict with other network devices.

Figure 3:
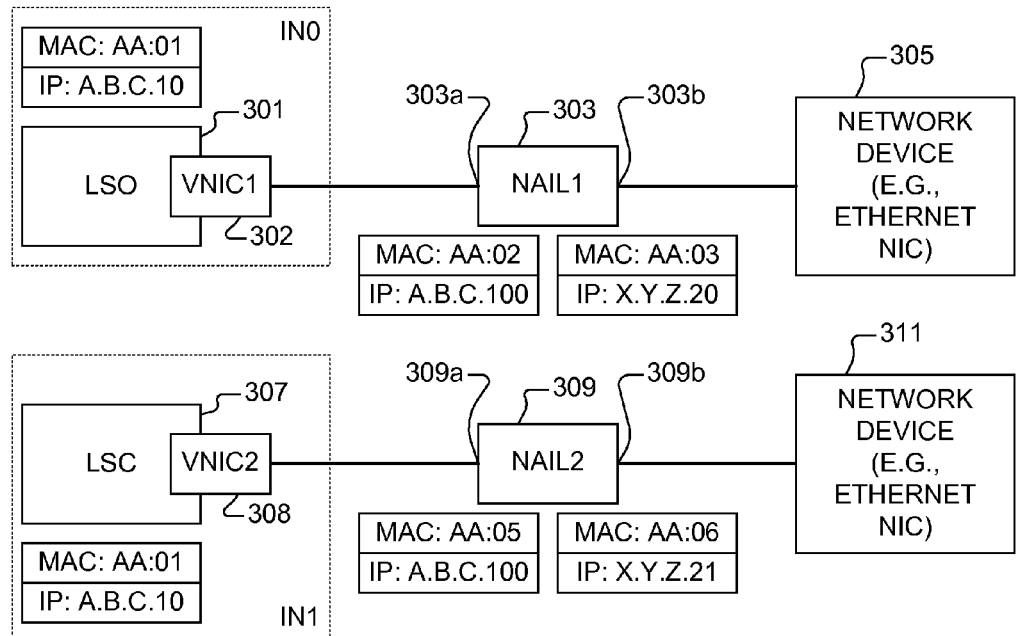
FIG. 3 is a block diagram more specifically illustrating NAILs implemented according to embodiments of the present invention to enable communication by multiple logical servers on a network.

FIG. 3 is a block diagram more specifically illustrating NAILs implemented according to embodiments of the present invention to enable communication by multiple logical servers on a network. As shown, a first logical server 301 interfaces a first network device 305 via a first VNIC 302 and NAIL 303, labeled NAIL1. The first logical server 301 is an original or master labeled LSO. In this example, the logical server 301 is replicated to generate another logical server 307, which is a clone or copy of the logical server 301 and labeled LSC. It is noted, however, that the second and any other additional computers do not have to be copies of the first and may simply be different computers with the same or different network identifiers, as further described below. The logical server 307 interfaces a second network device 311 via a second VNIC 308 and a second NAIL 309, labeled NAIL2. The network devices 305 and 311 are implemented according to any appropriate network device used to enable a logical server to communicate, such as Ethernet NICs or the like. The network devices 305, 311 each represent either a logical device (e.g., VNIC) implemented within the virtualized layer of an underlying physical server, or a physical NIC, such as a NIC expansion card plugged into an expansion slot of the physical server. Although two separate NICs 305, 311 are shown, there may be only one NIC in which both NAILs 303 and 309 are bound to the same physical NIC, such as on the same physical server.

The IP addresses of both of the logical servers 301 and 307 are the same, e.g., "A.B.C.10". Also, the gateway IP addresses are the same, e.g., "A.B.C.100". MAC addresses are assigned to each interface or communication port to allow control of the media between devices to enable communications. In this case, the MAC addresses are also the same, e.g., "AA:01". The MAC address of the logical servers 301 and 307 are shown in simplified format as "AA:01". It is understood by those of ordinary skill in the art that a MAC address is typically a 48-bit address as defined by IEEE Standards, and is typically expressed in hexadecimal notation using 12 hexadecimal numbers separated by colons, e.g., "12:34:56:78:9A:BC". A shortened notation is used herein for simplicity.

Since the logical servers 301, 307 are both logical and implemented within a virtualized layer of a physical device, the MAC addresses are not necessarily burned in and may be readily modified. If this is the case, then after the logical server 307 is created, its MAC address can be modified. It is noted, however, that the MAC address need not be changed and could, in fact, be kept the same as well. There are situations in which it is desired to maintain the same MAC address. Certain application programs, for example embed a specific MAC address upon installation for various purposes, such as, for example, license verification of the software. The NAIL adds an isolated layer for the computer and enables network communication regardless of whether the MAC address is the same or different. Thus, the IP and/or MAC addresses may be the same or different for the computers within the isolated networks.

The NAIL 303 is a logical device implemented to include a pair of virtual ports, including a first isolated port 303*a* for interfacing the logical server 301 via the VNIC 302 and a second port 303*b* for interfacing the network device 305. The first port 303*a* is given or otherwise programmed with a MAC address "AA:02" and the gateway IP address "A.B.C.100".

The second "abstraction" port 303b is given or otherwise programmed with a different MAC address "AA:03" and a virtual IP address "X.Y.Z.20". The term "abstraction" refers to the opposite side of the NAIL relative to the isolated side in which the identity of the isolated computer has been abstracted (e.g., aliased or altered). In this manner, the logical server 301 uses the isolated and gateway IP addresses (e.g., "A.B.C.10" and "A.B.C.100", respectively) to communicate with the NAIL 303, which performs translation between the isolated IP address "A.B.C.10" and the virtual IP address "X.Y.Z.20" for enabling communications with devices on the abstraction side of the NAIL 303. For example, a communication or packet from the logical server 301 includes the source address "A.B.C.10" and a destination address along with port information. The NAIL 303 substitutes the source address "A.B.C.10" with its source address "X.Y.Z.20" and forwards the communication in the network towards the destination address. A response communication from the targeted destination arrives at the NAIL 303 with a destination address "X.Y.Z.20", and the NAIL 303 forwards the communication to the logical server 301.

In a similar manner, the NAIL 309 is a logical device implemented to include a pair of virtual ports, including a first isolated port 309a for interfacing the logical server 307 via the VNIC 308 and a second abstraction port 309b for interfacing the network device 311. The isolated port 309a is given or otherwise programmed with a MAC address "AA:05" and the gateway IP address "A.B.C.100". The abstraction port 309b is given or otherwise programmed with a different MAC address "AA:06" and a different virtual IP address "X.Y.Z.21". In this manner, the logical server 307 uses the same isolated and gateway IP addresses (e.g., "A.B.C.10" and "A.B.C.100", respectively) to communicate with the NAIL 309, which performs translation between the IP address "A.B.C.10" and the virtual IP address "X.Y.Z.210" for enabling external communications in a similar manner as described above for the NAIL 303.

It is appreciated that each of the logical servers 301 and 307, although communicating using the same, duplicated IP and MAC addresses, are isolated within separate and independent and isolated micro-networks or private networks behind a corresponding NAIL, which performs network address translation and/or substitution to enable the logical server to communicate on the network. As shown, for example, LSO is located in IN0 and LSC is located within IN1. The network devices 305 and 311, even if located within a common local network as the logical servers 301 and 307, are external relative to the isolated networks IN0 and IN1 separated by the NAILs 303 and 309, respectively. Each NAIL includes an isolated side interfacing the isolated server (e.g., logical servers 301 and 307) and an abstraction side interfacing one or more devices in the network (e.g., the network devices 305 and 311). Each NAIL performs address translation and/or substitution within communication packets (e.g., packet headers and/or packet payloads) and tracks session activity to avoid identification conflict and/or ambiguity among isolated computers on a network.

Figure 4:
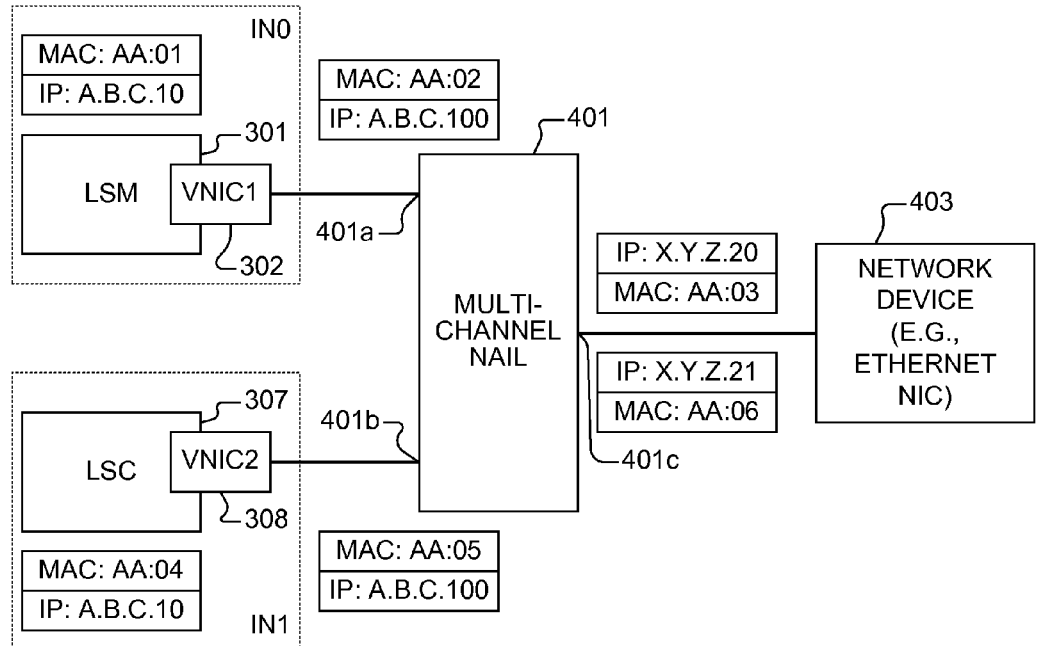
FIG. 4 is a block diagram of a multi-channel NAIL implemented according to an alternative embodiment of the present invention.

FIG. 4 is a block diagram of a multi-channel NAIL 401 implemented according to an alternative embodiment of the present invention to enable communication by multiple logical servers on a network. Similar components are given identical reference numbers. In this case, the MAC address of the computer 307 is modified to "AA:04" to illustrate flexibility of the present invention. The multi-channel NAIL 401 replaces the NAILs 303 and 309, and includes a first isolated port 401a with MAC address "AA:02" and gateway IP address "A.B.C.100" for interfacing LSO 301 via VNIC 302 and a second isolated port 401b with MAC address "AA:05" and gateway IP address "A.B.C.100" for interfacing LSC 307 via VNIC 308. The multi-channel NAIL 401 may be implemented with two abstraction ports for replacing ports 303b and 309b for interfacing multiple network devices. As shown, however, the multi-channel NAIL 401 includes a single abstraction port 401c for interfacing a single, shared network device 403, which is similar to either of the network devices 305 and 311 and may either be a logical or physical device. The port 401c is assigned a single MAC address, such as "AA:03", although the two separate virtual addresses "X.Y.Z.20" and "X.Y.Z.21" are used for the respective logical servers 301 and 307. The multi-channel NAIL 401 changes packet headers and keeps track of each session of each logical server 301 and 307 to properly distribute packets between the logical servers and external devices.

Figure 5:
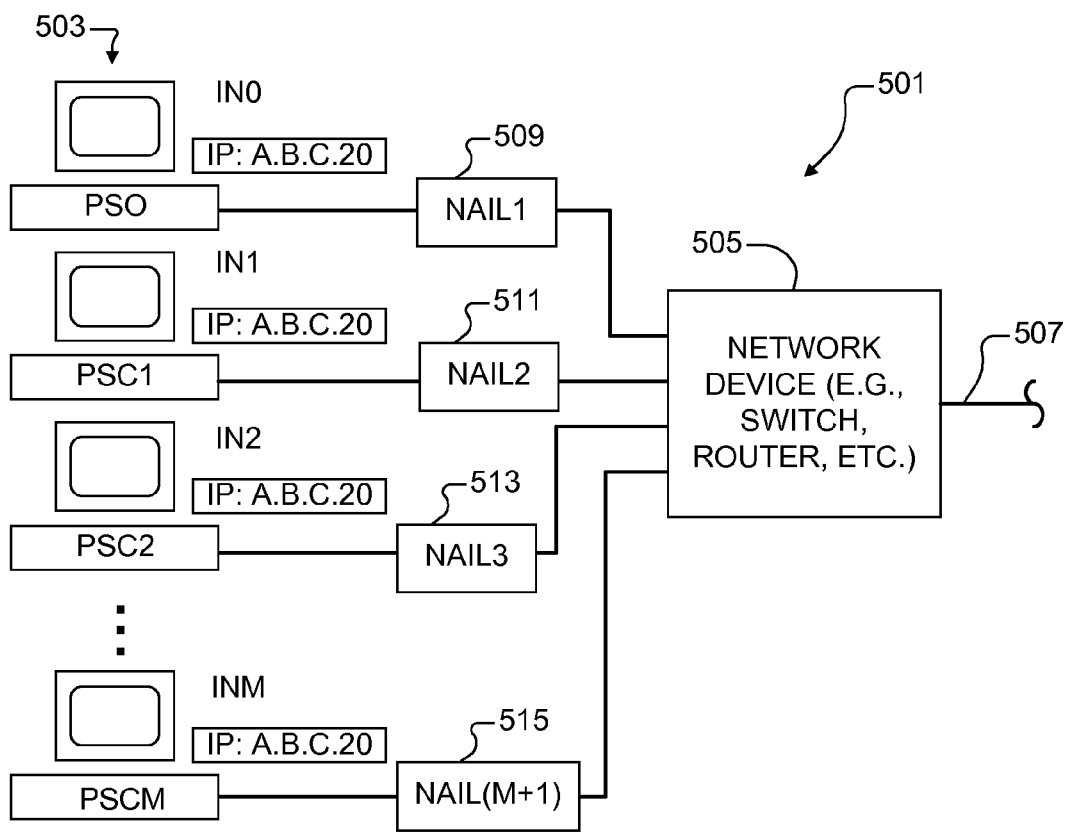
FIG. 5 is a block diagram of a network implemented according to an exemplary embodiment of the present invention employing physical devices.

FIG. 5 is a block diagram of a network 501 implemented according to an exemplary embodiment of the present invention employing physical devices. In this case, the network 501 includes M+1 physical servers 503, shown individually as PSO, PSC1, PSC2, . . . , PSCM, where M is any positive integer greater than zero. In one embodiment, the physical servers PSC1-PSCM are replicated from the first server PSO, which is an original or master computer system. For the case of replicating physical computers, each replicated system is implemented using a different yet similar hardware structure, such as using similar CPU's, similar-sized disk drives, similar-sized memory devices, etc. The software system on the master PSO is then copied or otherwise replicated on each of the cloned systems PSC1-PSCM. The software system includes, for example, the operating system (OS) and any or all of the installed application software programs and any or all associated application files (e.g., data files, device drivers, etc.).

It is noted that the physical servers 503 may simply be different computers with the same or different network identifiers as previously described. The physical servers 503 are each coupled to a network device 505, which enables communication between physical servers 503 and with external devices. Although not shown, each physical server 503 includes a physical NIC for communicating on a corresponding data link according to a selected data link protocol. External communication is enabled via a separate network connection, media link or medium 507 provided on the network device 505. The network device 505 is implemented as any standard network communication device, such as a switch or router or the like as known to those of ordinary skill in the art.

In the embodiment shown, the physical servers PSC1-PSCM each have the same isolated IP address "A.B.C.10" as the master server PSO in a similar manner as the logical servers 103 described above. The MAC addresses may the same, although physical NICs typically have a pre-configured unique MAC address. Such duplication of the network identifier (e.g., IP address) would otherwise prevent any of the physical servers 103 from communicating within devices in the local network 501 or with external devices (e.g., remote or public devices) because of identification conflicts. Note that a NAT function in the network device 505, by itself, would not be enable communications since it operates to translate different IP addresses to a common IP address to make multiple computers appear as the same computer. In the case illustrated, the physical servers all have the same IP address. In a similar manner as described above for the logical case, a NAIL is provided between each physical server 503 and the network device 505 to enable communications. Each NAIL may be implemented using software and/or hardware with a corresponding physical server 503, on a corresponding port of the network device 505, or inserted as a separate physical device on the physical data link between each physical server and the network device 505. As shown, for example, a first NAIL 509 (NAIL1) is coupled between PSO and a port on the network device 505, a second NAIL 511 (NAIL2) is coupled between PSC1 and another port on the network device 505, a third NAIL 513 (NAIL3) is coupled between PSC2 and another port on the network device 505, and so on and finally a last NAIL 515 (NAIL(M+1)) is coupled between PSCM and another port on the network device 505. A physical NAIL includes appropriate network ports (e.g., Ethernet ports) and NAIL infrastructure, which operates as a gateway for the corresponding physical server 503 in a similar manner as described above for the logical servers 103.

As with the logical case, each of the NAILs 509-515 includes an isolated side or interface with the isolated physical server and an abstraction side with an interface with a network devices, such as the network device 505. The addition of the NAILs 509-515 effectively locates each of the physical servers 503 within its own IN, shown as IN0, IN1, IN2, . . . , INM in a similar manner as previously described. The NAILs isolate each server within its own private network layer and enable external communications without identification conflicts or ambiguities.

Figure 6:
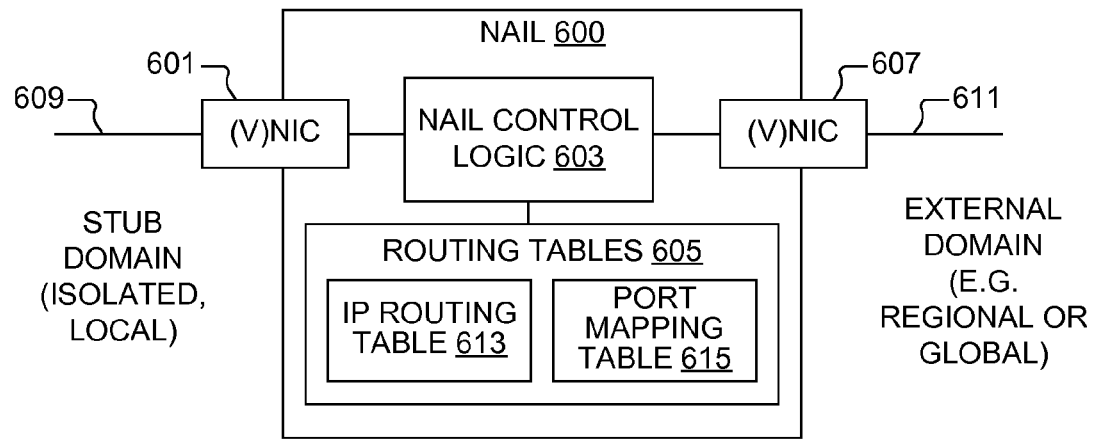
FIG. 6 is a block diagram of an exemplary NAIL implemented according to an embodiment of the present invention.

FIG. 6 is a block diagram of an exemplary NAIL 600 implemented according to an embodiment of the present invention. The NAIL 600 includes a (V) NIC 601 that interfaces another NIC or VNIC via the appropriate physical or virtual media or medium 609 of the isolated stub domain (which is the private side establishing the isolated network layer). The notation "(V) NIC" means that it may be a physical NIC or a logical VNIC depending upon the particular application and implementation. In the logical configuration of FIG. 3, for example, the (V) NIC 601 may be a logical VNIC for interfacing the VNIC 302 or a physical NIC for interfacing a NIC of a physical device, such as the physical server PSC1. The medium 609 may also be logical or physical, and is implemented according to a selected data link protocol, such as, for example, Ethernet, Token Ring, FDDI, ATM, SONET, X.25, etc. as known to those of ordinary skill in the art. Wireless configurations are also contemplated. Each (V) NIC incorporates the IP protocol stack for converting between the selected data link protocol and the stack layers appropriate for address translation, such as TCP/IP layers 3 and/or 4 for accessing and manipulation (substitution) of IP addresses. The NAIL 600 includes another (V) NIC 607 that communicates across a physical or virtual medium 611 of an external domain, such as, for example, a local, a regional, or a global domain.

The NAIL 600 includes NAIL control logic 603 interfaced to the (V) NICs 601 and 607 for performing address translation operations and for routing or otherwise forwarding packets between the respective domains. In one embodiment, the NAIL control logic 603 is implemented using modified NAT functionality (e.g., a μNAT or the like). In the configuration shown, the NAIL control logic 603 employs one or more routing tables 605 for storing routing information used for address translation and session control. As shown, the routing tables 605 include an IP routing table 613 for storing the isolated, virtual and gateway IP addresses used for address translation. Thus, for example, a packet received from the isolated device via (V) NIC 601 with a local source IP address, such as, for example, "A.B.C.10" is modified by substituting the isolated address with the corresponding virtual IP address, such as, for example, "X.Y.Z.20", and the modified packet is forwarded to a device on the abstraction side via the (V) NIC 607. Packets arriving from another device via (V) NIC 607 with an IP destination address of "X.Y.Z.20" are modified by substituting the abstraction address with the isolated address (e.g., from "X.Y.Z.20" to "A.B.C.10") and the modified packet is forwarded to the isolated device via the (V) NIC 601. The NAIL control logic 603 may also modify other information in the packets, such as, for example, the IP checksum and the TCP checksum and other places where the IP address appears (e.g., File Transport Protocol (FTP), Internet Control Message Protocol (ICMP)).

The routing tables 605 may include a port mapping table 615 or the like for renumbering ports of each session to keep track of multiple sessions of multiple applications. Although the NAIL 600 need not track communications for multiple isolated devices since it is providing address translation for only one device, the isolated device may execute multiple applications which may activate multiple simultaneous sessions. The NAIL control logic 603 performs address translation and session tracking using the routing tables 605, which may be implemented as programmable look-up tables or the like. It is noted that the present invention is not limited to specific implementations of routing tables and/or port mapping tables or the like. In general, the NAIL control logic 603 employs any form of a configurable list of translations.

Figure 7:
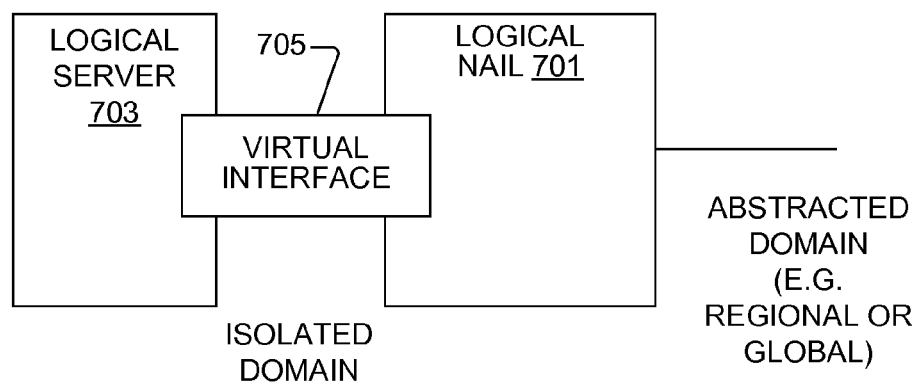
FIG. 7 is a block diagram illustrating an exemplary logical NAIL implemented according to an alternative embodiment of the present invention.

FIG. 7 is a block diagram illustrating an exemplary logical NAIL 701 implemented according to an alternative embodiment of the present invention. The logical NAIL 701 includes a virtual interface 705 that directly interfaces with the logical server 703. The logical NAIL 701 and the logical servers 703 are implemented in substantially the same manner as the NAIL 600 and the logical server 301, except that the intermediate VNICs and medium (or media) links are replaced by the virtual interface 705. The virtual interface 705 provides a more direct communication link between a logical server and the corresponding NAIL by avoiding the dual protocol stack implementation of two VNICs.

Figure 8:
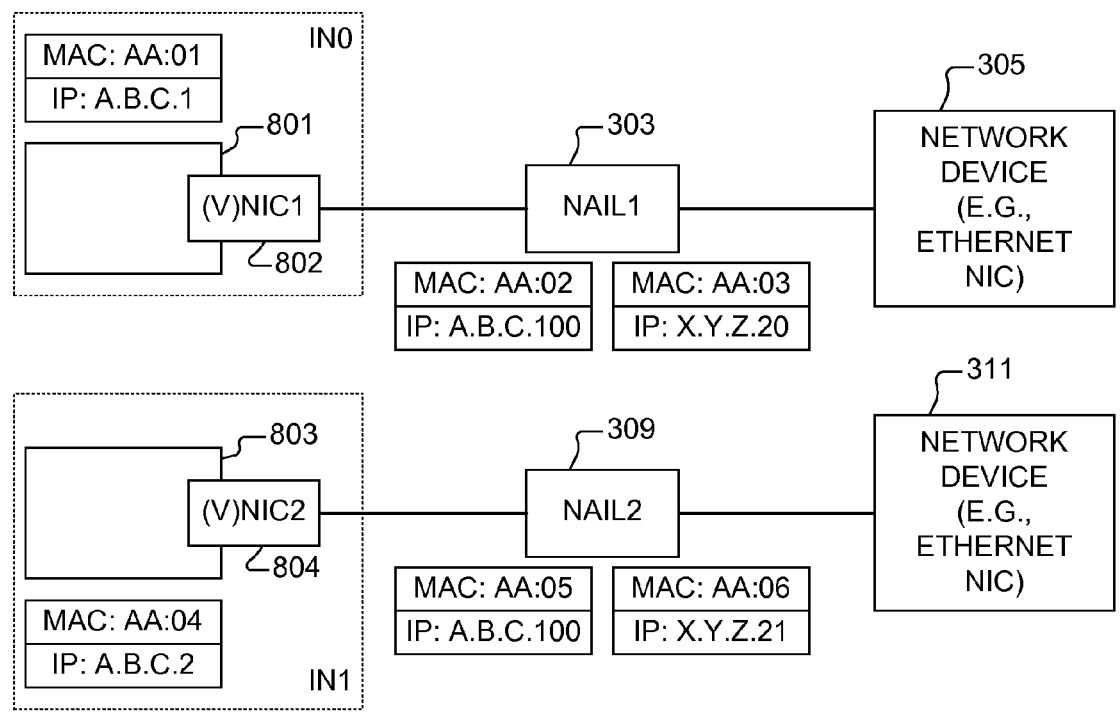
FIG. 8 is a block diagram illustrating the use of NAILs implemented according to embodiments of the present invention to enable communication by multiple computers on a network with different network identities.

FIG. 8 is a block diagram illustrating the use of NAILs implemented according to embodiments of the present invention to enable communication by multiple computers on a network with different network identities. The configuration shown in FIG. 8 is similar to that of FIG. 3 in which similar components assume identical reference numerals. In this case, the servers 301 and 307 are replaced with computers 801 and 803, which may or may not be replicas of each other, and which can be either logical or physical. The computer 801 interfaces the network device 305 via a first (V) NIC 802 and the NAIL 303, and the computer 803 interfaces the network device 311 via a second (V) NIC 804 and the NAIL 309, where the (V) NICs are virtual or physical. The MAC address of computer 801 is shown as "AA:01" and the IP address is shown as "A.B.C.1". The MAC address of computer 803 is shown as "AA:04" and the IP address is shown as "A.B.C.2". In this case, therefore, the computers 801 and 803 could potentially communicate on the network directly without isolation.

Nonetheless, the computers 801 and 803 are isolated and abstracted or otherwise aliased behind the NAILs 303 and 309, respectively, to provide network identity control for other reasons, such as for implementing server or application farms, cluster failover, re-routing functionality, virtual local area networks (VLANs), network traffic filtering, disaster recovery, etc. The NAIL configuration provides complete control of network identity in the network regardless of whether potential identification conflicts between computers exists or not.

Figure 9:
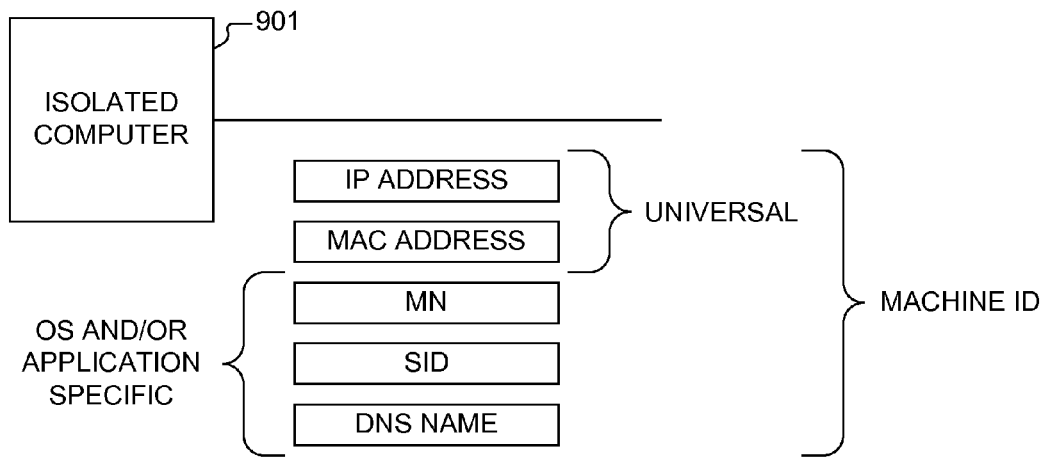
FIG. 9 is a block diagram illustrating the composition of the machine identifier (ID) of an isolated computer.

FIG. 9 is a block diagram illustrating the composition of the machine identifier (ID) of an isolated computer 901. The IP address and MAC address are universal identifiers among substantially all operating systems. The MN, SID and DNS Name identifiers are OS and/or application specific. The machine ID at least includes the IP address and the MAC address, and optionally includes the MN, SID and the DNS Name.

Figure 10:
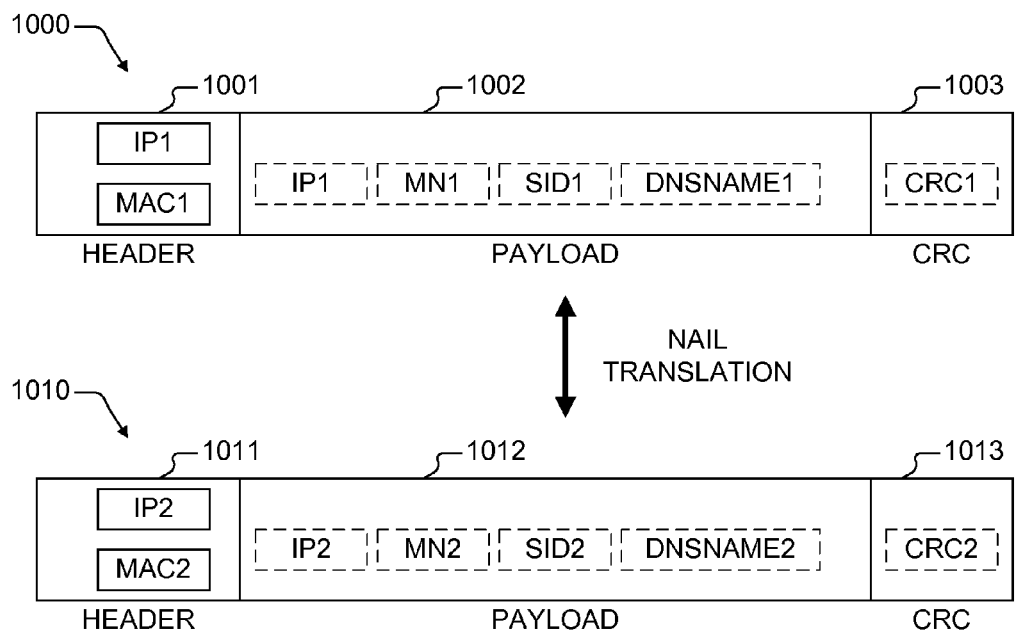
FIG. 10 is a block diagram illustrating packet translation performed by NAIL.

FIG. 10 is a block diagram illustrating packet translation performed by the NAIL masquerading function between a first packet 1000 and a second packet 1010. The first packet 1000 includes a header 1001, a payload 1002 and a CRC field 1003 and the second packet 1010 includes a header 1011, a payload 1012 and a CRC field 1013. The header 1001 includes a specific IP address IP1 and a specific MAC address MAC1. During NAIL translation, the header 1001 is converted to the header 1011 of the packet 1010, which includes a modified IP address IP2 and a modified MAC address MAC2. Thus, NAIL inspects every packet and translates the IP address between IP1 and IP2 and the MAC address between MAC1 and MAC2 of the packet headers. For certain protocols, such as Telnet, translation of the headers is sufficient. In other protocols, such as, for example, FTP, translation is further performed on the payload. If there are no identifiers in the packet, then translation is complete.

The payloads 1002, 1012 of the packets 1000, 1010, respectively, optionally embed any one or more of the IP address, the machine name, the system/security identifier, and the DNS Name. As shown, for example, the packet 1000 includes the IP address IP1, the machine name MN1, the system/security identifier SID1, and the DNS Name DNSNAME1, and the packet 1010 includes the IP address IP2, the machine name MN2, the system/security identifier SID2, and the DNS Name DNSNAME2. The identifiers shown in the respective payloads are optional and thus shown with dashed lines so that none or any combination of one or more identifiers is possible depending upon the particular packet and/or communication protocol employed. Thus, when NAIL translates between the payloads 1002 and 1012, it translates between IP1 and IP2, MN1 and MN2, SID1 and SID2 and/or DNSNAME1 and DNSNAME2. If any translation is performed between the payloads 1002 and 1012, then the CRC is translated between CRC1 and CRC2 to maintain packet validity.

It is noted that during boot-up of the OS of a server or computer system, broadcast packets are typically sent out to advertise the computer on the network. Such broadcast packets are referred to as Address Resolution Protocol (ARP) packets, which incorporate a portion of the machine identity in the packet payload, such as the IP and MAC addresses of the machine. The ARP packets are often transmitted prior to completion of the OS boot process, where the OS waits before loading the entire protocol stack and drivers. In this manner, the complete NAIL driver may not be completely loaded when the ARP packets are otherwise transmitted. Thus, such ARP packets may include the original IP and MAC addresses prior to masquerading, which may otherwise lead to improper operation or network communication failure. The NAIL service prevents the transmission or broadcast of ARP packets during startup of the computer or boot-up of the OS. The NAIL driver is either active and blocking such packets or passive and preventing broadcast transmissions until fully loaded. The NAIL begins translating when fully loaded and active to enable the isolated system to communicate on the network. In this manner, ARP packets from the isolated computer are not allowed to advertise an identity on the network until NAIL is able to begin translating to present the intended masqueraded identity.

Although the present invention has been described in considerable detail with reference to certain preferred versions thereof, other versions and variations are possible and contemplated. Also, those skilled in the art should appreciate that they can readily use the disclosed conception and specific embodiments as a basis for designing or modifying other structures for providing out the same purposes of the present invention without departing from the spirit and scope of the invention as defined by the appended claims.

What is claimed is:

1. A non-transitory computer-readable storage medium encoded with a virtual network abstraction and isolation layer which instructs a processor to masquerade the machine identity of a computer in a local network to enable the computer to communicate in the local network with a different machine identity, comprising:
   a first set of interface instructions, encoded on the computer-readable storage medium, which instructs the processor to configure a virtual isolated network interface for communicating with the computer;
   a second set of interface instructions, encoded on the computer-readable storage medium, which instructs the processor to configure an abstraction network interface for communicating with a network device coupled to the local network; and
   control instructions, encoded on the computer-readable storage medium, which instruct the processor to translate an IP address and a Media Access Control (MAC) address to a different IP address and a different MAC address, respectively, in a packet header of a communication packet transmitted between said virtual isolated and abstraction network interfaces, and to instruct the processor to translate at least one of a machine name and a system identifier to a different machine name and a different system identifier, respectively, in a packet payload of the communication packet.

2. The non-transitory computer-readable storage medium of claim 1, wherein said control instructions further instruct the processor to translate at least one of an IP address and a Domain Name Service (DNS) Name to a different one of an IP address and a DNS Name, respectively, in the packet payload of the communication packet.

3. The non-transitory computer-readable storage medium of claim 1, wherein said control instructions further instruct the processor to translate an IP address to a different IP address in the packet payload of the communication packet between said virtual isolated and abstraction network interfaces.

4. The non-transitory computer-readable storage medium of claim 3, wherein said control instructions further instruct the processor to translate a Domain Name Service (DNS) Name to a different DNS Name in the packet payload of the communication packet.

5. The non-transitory computer-readable storage medium of claim 1, wherein said control instructions further instruct the processor to employ a configurable list of translations.

6. The non-transitory computer-readable storage medium of claim 1, wherein said control instructions further instruct the processor to selectively translate communication packets based on communication protocol.

7. A network abstraction and isolation layer (NAIL) apparatus for masquerading the machine identity of a computer in a local network to enable the computer to communicate in the local network with a different machine identity, comprising:
   a physical isolated network interface port which is configured to communicate with the computer;
   a physical abstraction network interface port which is configured to communicate with a network device coupled to the local network; and a control device, coupled between said isolated and abstraction network ports, which is configured to perform machine identity translation to masquerade machine identity of the computer within the local network;

wherein said control device is configured to translate an IP address and a Media Access Control (MAC) address to a different IP address and a different MAC address, respectively, in a packet header of a communication packet transmitted between said isolated and abstraction network ports, and wherein said control logic is further configured to translate at least one of a machine name and a system identifier to a different machine name and a different system identifier, respectively, in a packet payload of the communication packet.

8. The NAIL apparatus of claim 7, wherein said control device is further configured to translate at least one of an IP address and a Domain Name Service (DNS) Name to a different one of an IP address and a DNS Name, respectively, in the packet payload of the communication packet.

9. The NAIL apparatus of claim 7, wherein said control device is configured to translate an IP address to a different IP address in the packet payload of the communication packet between said isolated and abstraction network ports.

10. The NAIL apparatus of claim 9, wherein said control device is further configured to translate a Domain Name Service (DNS) Name to a different DNS Name in the packet payload of the communication packet.

11. The NAIL apparatus of claim 7, wherein said control device is configured to employ a configurable list of translations.

12. The NAIL apparatus of claim 7, wherein said control device is configured to selectively translate communication packets based on communication protocol.

13. A system to masquerade the machine identity of a computer in a local network to enable the computer to communicate in the local network with a different machine identity, the system comprising:

computer hardware including at least one computer processor; and computer-readable storage comprising computer-readable instructions that, when executed by the computer processor, cause the computer hardware to perform operations defined by the computer-executable instructions including:

configuring a virtual isolated network interface for communicating with a computer in a local network;

configuring an abstraction network interface for communicating with a network device coupled to the local network;

translating an IP address and a Media Access Control (MAC) address to a different IP address and a different MAC address, respectively, in a packet header of a communication packet transmitted between the virtual isolated network interface and the abstraction network interface; and translating at least one of a machine name and a system identifier to a different machine name and a different system identifier, respectively, in a packet payload of the communication packet.

14. The system of claim 13, wherein the computer-executable instructions further comprise translating at least one of an IP address and a Domain Name Service (DNS) Name to a different one of an IP address and a DNS Name, respectively, in the packet payload of the communication packet.

15. The system of claim 13, wherein the computer-executable instructions further comprise translating an IP address to a different IP address in the packet payload of the communication packet between said virtual isolated and abstraction network interfaces.

16. The system of claim 15, wherein the computer-executable instructions further comprise translating a Domain Name Service (DNS) Name to a different DNS Name in the packet payload of the communication packet.

17. The system of claim 13, wherein the computer-executable instructions further comprise employing a configurable list of translations.

18. The system of claim 13, wherein the computer-executable instructions further comprise selectively translating communication packets based on communication protocol.

* * * * *